June 6, 1961 H. H. CLARK 2,986,849
TIRE SIDEWALL FINISHING MACHINE AND METHOD
Filed Nov. 12, 1957 6 Sheets-Sheet 1

INVENTOR.
HAROLD H. CLARK
BY
*R. L. Miller*
ATTORNEY

INVENTOR.
HAROLD H. CLARK

June 6, 1961   H. H. CLARK   2,986,849
TIRE SIDEWALL FINISHING MACHINE AND METHOD
Filed Nov. 12, 1957   6 Sheets-Sheet 3

INVENTOR.
HAROLD H. CLARK
BY
R. L. Miller
ATTORNEY

June 6, 1961  H. H. CLARK  2,986,849
TIRE SIDEWALL FINISHING MACHINE AND METHOD
Filed Nov. 12, 1957  6 Sheets-Sheet 4

INVENTOR.
HAROLD H. CLARK
BY
*R. L. Miller*
ATTORNEY

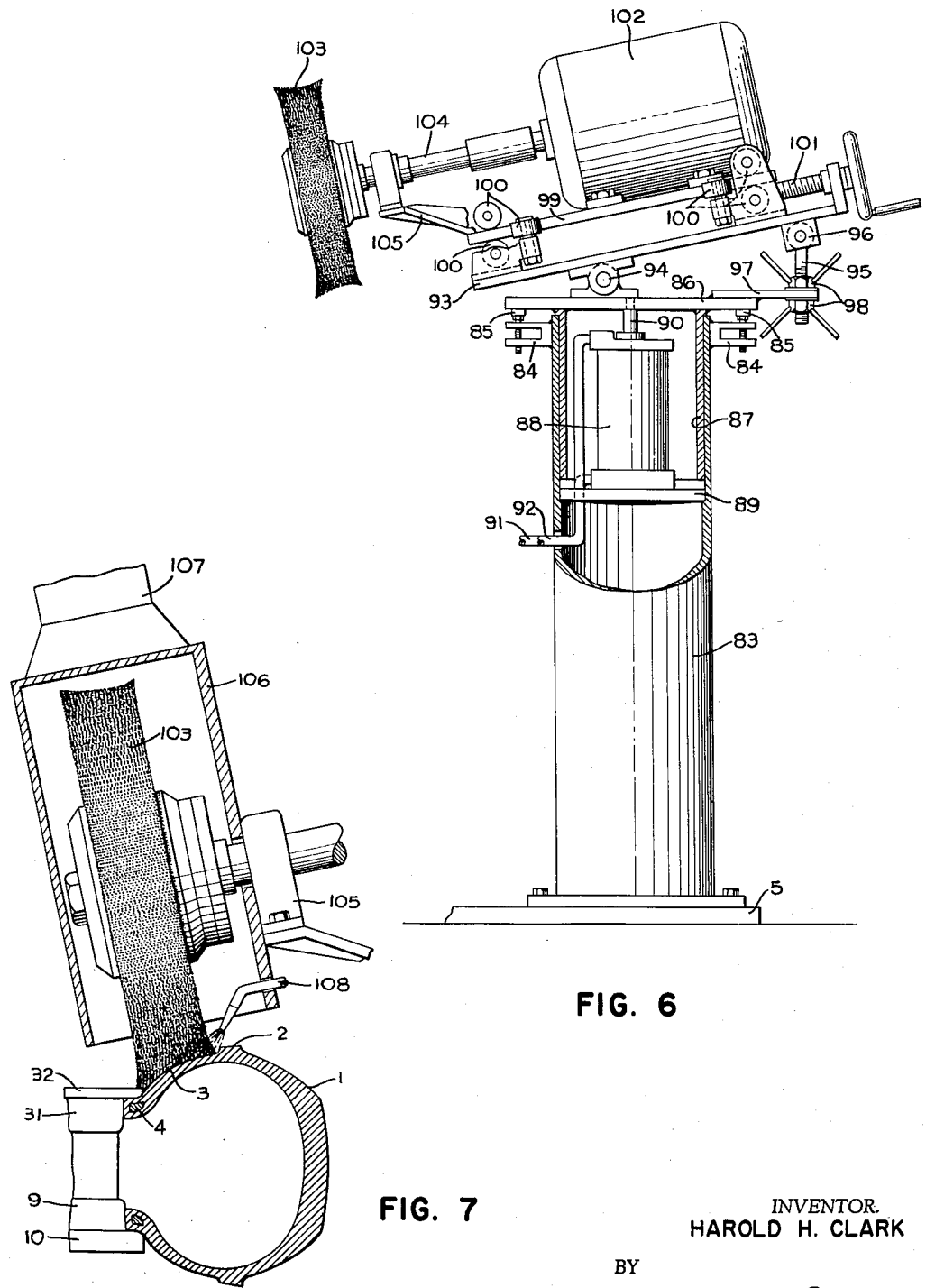

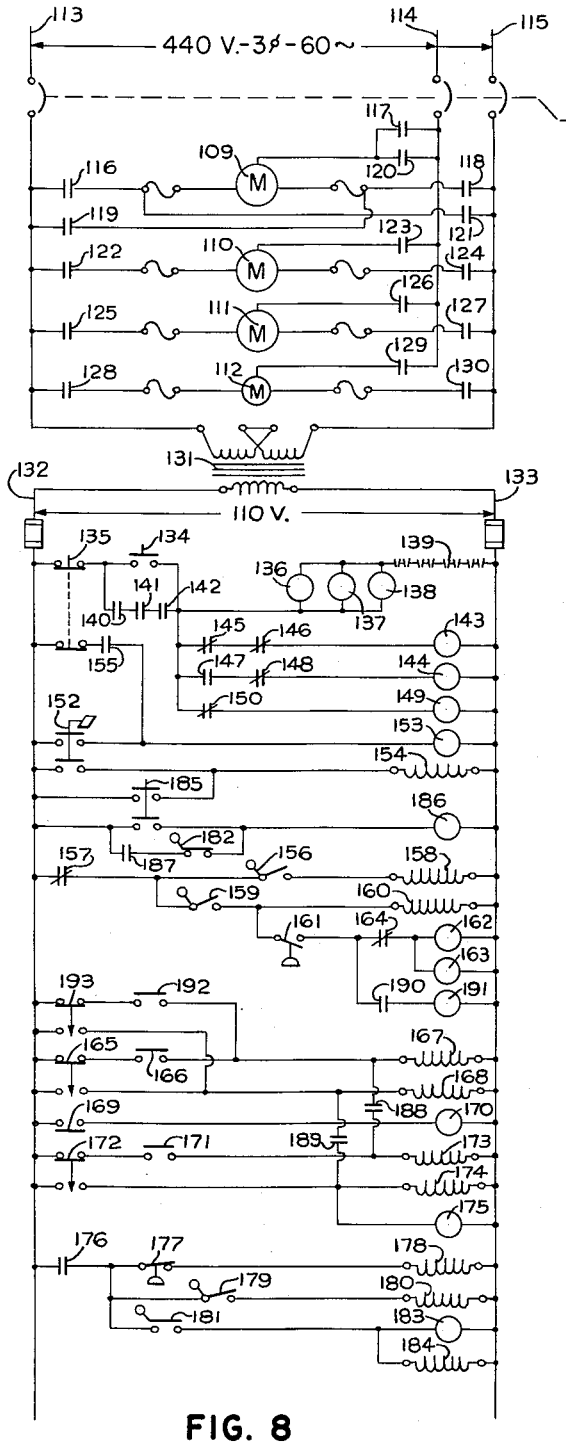
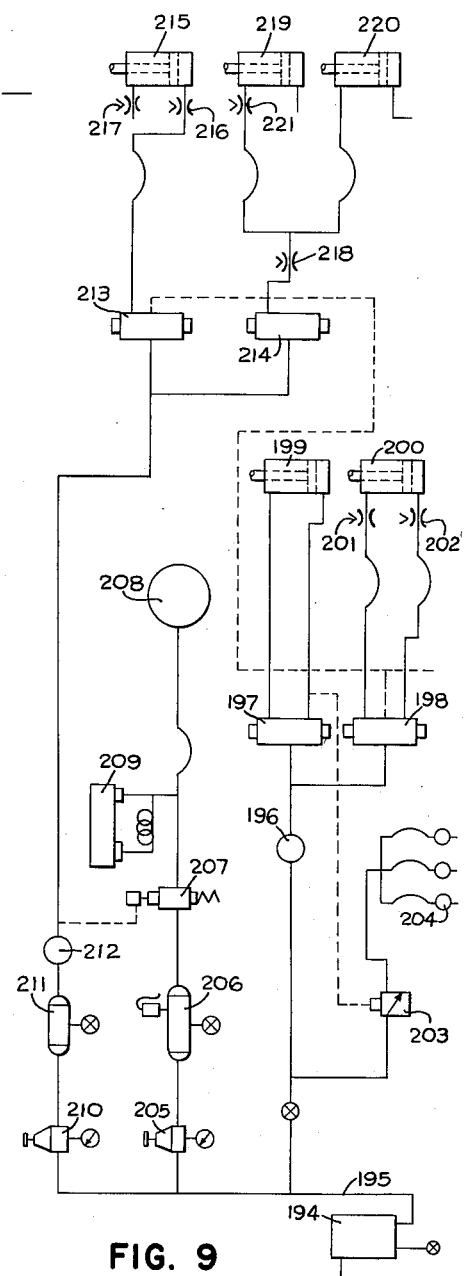
FIG. 8
FIG. 9
INVENTOR.
HAROLD H. CLARK
BY
R.L. Miller
ATTORNEY

United States Patent Office 2,986,849
Patented June 6, 1961

2,986,849
TIRE SIDEWALL FINISHING MACHINE AND METHOD
Harold H. Clark, Cuyahoga Falls, Ohio, assignor to The Goodyear Tire & Rubber Company, Akron, Ohio, a corporation of Ohio
Filed Nov. 12, 1957, Ser. No. 695,868
19 Claims. (Cl. 51—5)

This invention relates to cleaning the sidewall and abrading the annular rib on the sidewall of a pneumatic tire and particularly a white sidewall tire.

The manufacturing of white sidewall tires includes vulcanization of a tire in a mold, the white sidewall layer having been applied prior to vulcanization. After cure, the surface of the white sidewall is usually soiled or discolored due to handling during the tire building operation or contact with the wall of the mold during vulcanization. In addition to this, the white sidewall rubber and the black rubber of the rib and shoulder usually overlap and such overlapping is ordinarily along an irregular line within the rib area. These conditions make it necessary to clean the white sidewall and to abrade away the overlapping rubber in the rib area sufficiently to provide a regular and distinct line of demarcation between the colored rubbers.

One of the problems encountered in cleaning the white sidewall with prior machines is the tendency to smear the sidewall during the buffing operation due to the fact that black rubber is transported by the buffing wheel, which is often in contact with the black rubber rib as well as the white sidewall, from the rib and shoulder area onto the white sidewall rubber. Therefore, it is one of the objects of the present invention to provide a means to buff the sidewall in such a manner that the black rubber abraded away from the scuff rib portion is not transported to the white rubber of the sidewall.

Experience with the prior art machines has disclosed that buffing brushes tend to acquire a permanent set in the bristles after prolonged use in addition to which the bristles become dulled. In order to preserve the advantages of a brush over fabric buffing wheels, it is necessary that a solution to this problem be found. Therefore, it is an additional object of the present invention to provide a means which avoids the permanent setting of the bristles and also provides for resharpening of the bristles periodically.

As is well known in the tire art, when white sidewall tires are manufactured, it is almost impossible to maintain a regular line of demarcation between the white and black rubbers of the tire. It is, therefore, customary to mold a tire so that one of the colored rubbers overlaps the other usually within the rib area. After vulcanization, the tire is abraded in the area of overlap so that a clean neatly finished demarcation occurs between the two rubber stocks. It is a further object of this invention to provide a machine for simultaneously buffing and abrading a tire wall and which results in a finer more even finish on the abraded area of the tire wall.

Machines previously used to buff or grind tires are, in general, of the type wherein the tire is mounted with its midplane in a substantially vertical direction. Furthermore, the surface to be cleaned and ground in many cases faces away from the operator. These conditions make difficult the inspection of the tire during processing and also give rise to the problem of controlling the pressure exerted on the tire by the buffer or grinder mechanism to assure an even finish. It is an additional object of the present invention to rectify this situation to permit ease of inspection of the tire during processing and also to provide a self-adjusting mechanism which assures that a constant force is applied between the buffing and grinding elements and the tire.

Prior art machines have utilized tire-retaining devices which in general make it difficult and time consuming to mount the tire and inflate it for subsequent operations. A still further object of the present invention is the provision of a tire-retaining device which substantially decreases the difficulty of mounting the tire and also shortens the time necessary to load and unload the machine.

Since not all tires coming from the mold require a full buffing and grinding cycle, it is obviously wasteful to treat each tire with a full cycle time. The present invention has for yet another object the provision of a control feature which permits the treatment of some of the tires for a lesser period of time, but, nonetheless, one which is sufficient to complete the cleaning and grinding operation.

These and other objects of the present invention will become apparent from the following description and the drawings in which:

FIG. 6 is an elevation view of the tire buffing assembly taken along the lines C—C of FIG. 1;

FIG. 7 is a detail of the arrangement of the buffing wheel shown in FIG. 6;

FIG. 8 is a diagram of the automatic control circuit utilized with the machine;

FIG. 9 is a diagram of the pneumatic controls of the machine.

Figure 1:
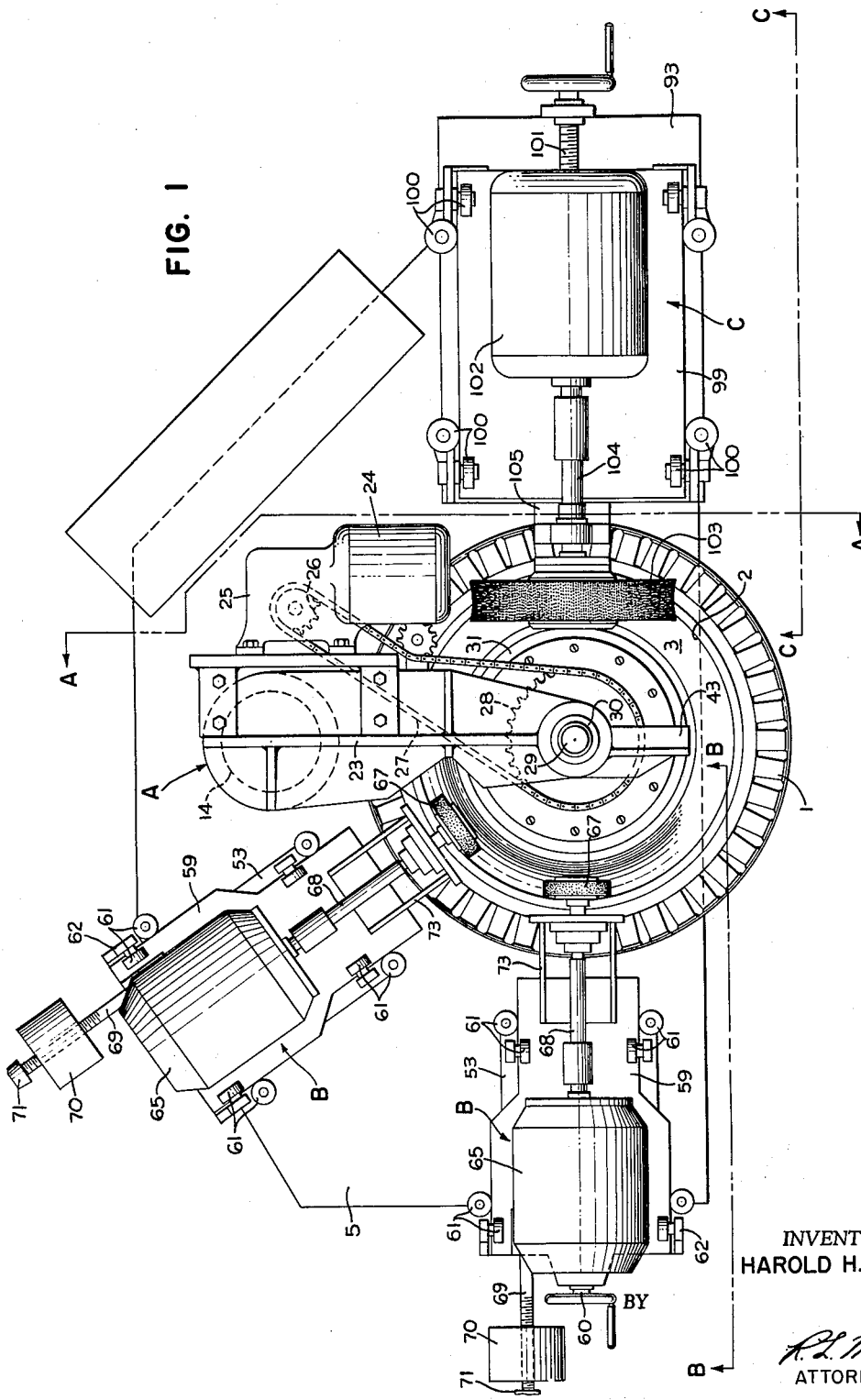
FIG. 1 is a top plan view of a machine according to the present invention.

The tire sidewall buffing and rib grinding machine will be described by assemblies in the interest of clarity. It should be remembered, however, that the assemblies are disposed on a common base 5 substantially in the manner of FIG. 1. In FIG. 1 a tire 1 is mounted on the tire inflation and rotating assembly A and is adapted to be rotated about an axis perpendicular to the plane of the figure. The grinder assemblies B, located adjacent the inflation assembly A, control a pair of grinders which contact the rib area 2 of the tire 1. A buffer assembly C, also located adjacent the assembly A, controls a contoured buffing wheel which contacts the sidewall area 3 of the tire 1 intermediate the rib 2 and bead 4 thereof. A detailed description of the assemblies and the control and operation of the machine follows.

*Tire mounting and inflation assembly*

Figure 2:
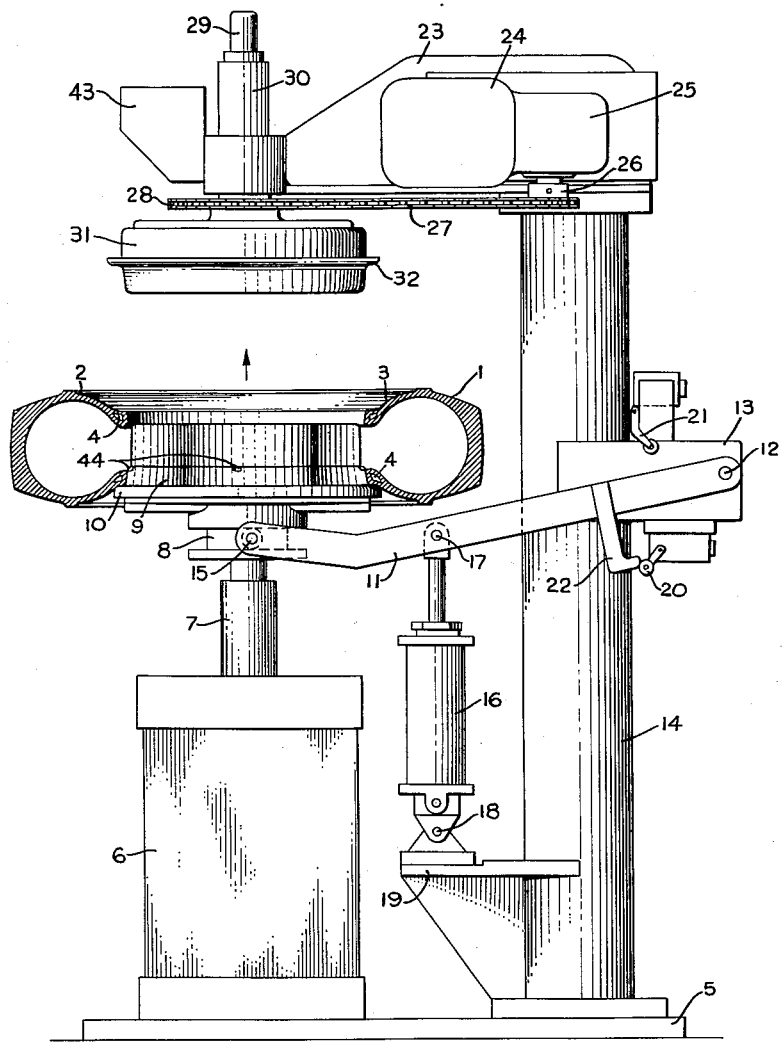
FIG. 2 is an elevation of the tire mounting and locking assembly of the present invention taken along the line A—A of FIG. 1.
Figure 3:
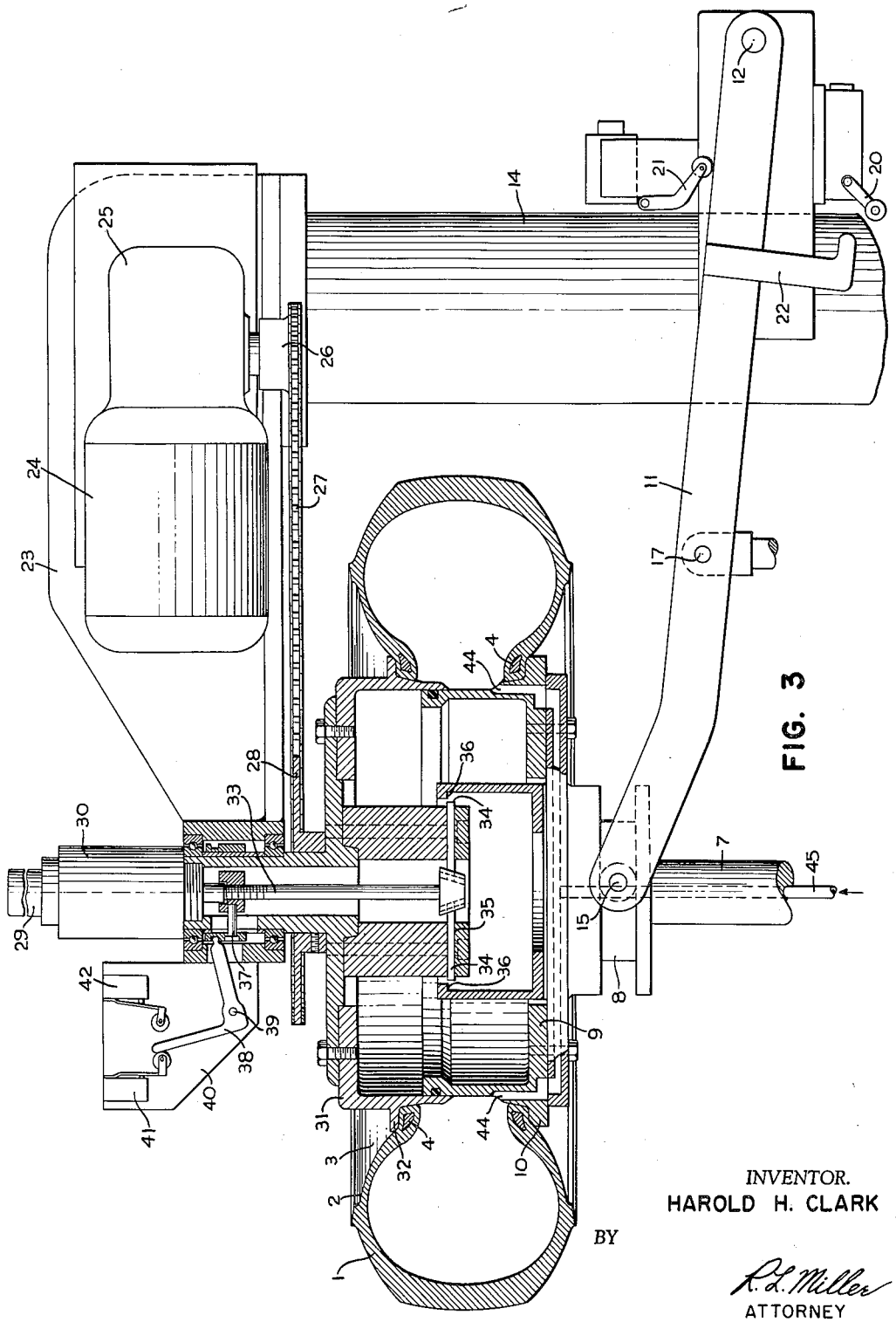
FIG. 3 is a detail of the tire mounting and inflation mechanism of the present invention.

The tire mounting and inflation assembly A is shown in FIGS. 2 and 3. Referring to FIG. 2, a central support pedestal 6 is mounted on the base 5. A movable column 7 extends vertically up out of the pedestal 6 and attaches to the collar 8 and the lower half 9 of a split chuck removably secured thereto. The chuck half 9 has a flange 10 along the lower circumference against which the bead 4 of the tire 1 seats. Fitted onto the collar 8 is a lever arm 11 which is pivoted on a pin 12, in the support bracket 13 which is attached to a vertical column 14 mounted on the base 5 adjacent the pedestal 6. The lever arm 11 is attached to the collar 8 by means of a conventional yoke assembly 15 at one end of arm 11. A hydraulic actuating cylinder 16 is attached at its upper end to the lever arm 11 by means of a yoke and pin assembly 17 at a point intermediate the pivot pin 12 and the yoke 15 of the arm 11. The hydraulic actuating cylinder is attached to the column 14 at its lower end by means of a rocker plate 18 secured to table 19 mounted on column 14. It is obvious that the cylinder could be mounted in a variety of ways to secure the desired result, the present form being for illustrative purposes only. Two microswitches 20 and 21 are positioned on bracket 13 adjacent the pivot pin 12 of lever arm 11. Microswitch 20 is actuated by the vertical arm 22 forming an extension of lever arm 11. Microswitch 21 is actuated by contact with the lever arm 11 when a suitable movement thereof occurs.

A bracket plate 23 is mounted atop the vertical column 14 and supports the chuck rotating assembly comprising the motor 24, gear reduction box 25, sprocket 26, drive chain 27, and the sprocket 28. The sprocket 28 is attached to the rotatable shaft 29 mounted in the sleeve 30 and removably carries at its lower end the upper half 31 of the split chuck. The chuck half 31 has a circumferential flange 32, which is similar to the flange 10 on the lower chuck half and is designed to fit and seal against the upper bead 4 of the tire 1. A detail of the chuck rotating assembly and the chuck locking mechanism can be seen in FIG. 3. Chuck motor 24 mounted on bracket plate 23 is operably connected through a gear reduction mechanism 25 to the sprocket 26. Sprocket 26 drives the companion sprocket 28 through the interconnecting chain 27. Sprocket 28 being connected to the upper chuck half 31 rotates the entire chuck when it is in the engaged position as shown in FIG. 3 and consequently rotates the tire about the axis of the shaft 29. The motor may be, for example, ⅓ H.P. which rotates the chuck through the reduction means at about 16 r.p.m. In FIG. 3, the chuck halves are shown in the engaged position and the lever arm 11 in the upward position, the latter having moved to engage the lower chuck half 9 and the upper chuck half 31. This movement of lever arm 11 about the pin 12 has also deactuated the microswitch 20 due to movement of arm 22 with lever arm 11 and actuated the microswitch 21 due to contact by lever arm 11.

The chuck locking assembly is shown in detail in FIG. 3 located within the sleeve 30. The chuck lock mechanism comprises the rod 33, which is connected at its upper end to a hydraulic cylinder (not shown), and tapered at its lower end and keyed to locking lugs 34 so that a vertical movement of the rod 33 causes horizontal movement of the locking lugs 34 in the key ways 35. An outward movement of lugs 34 due to a down stroke of rod 33 causes the lugs 34 to lock under the flange 36 on the interior of lower chuck half 9. An extension arm 37 of the rod 33 is located on its upper portion and is slotted to receive one end of bell crank 38 pivoted by pin 39 on the bracket 40 which is attached to sleeve 30. The other end of bell crank 38 is disposed between two microswitches 41 and 42 mounted on bracket 40 and the whole is enclosed in housing 43.

The tire is automatically inflated by air entering the inner chamber thereof through inflation ports 44 located in the chuck half 9 which communicate with the air supply tube 45 located in the column 7.

Rib grinder assembly

Figure 4:
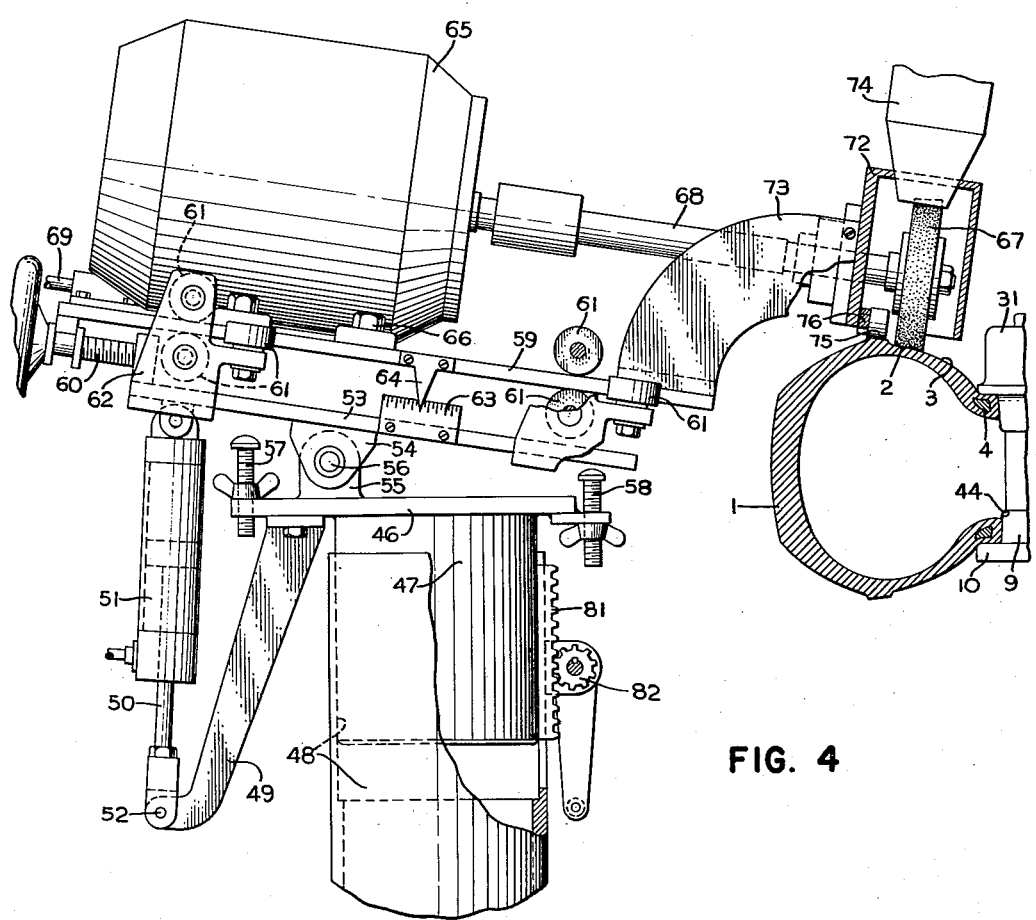
FIG. 4 is a detail of a typical grinding assembly of the machine taken along the line B—B of FIG. 1.
Figure 5:
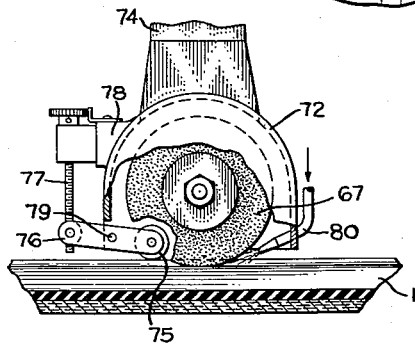
FIG. 5 is a detail of the arrangement of the grinding wheel shown in FIG. 4.

A rib grinder assembly typical of either assembly used on the machine, is shown in detail in FIGS. 4 and 5. The rib grinder assembly is attached by means of mounting plate 46 to vertical 47 which is slidably fitted into sleeve 48 which rests on the base 5 (not shown). An arm 49 is attached to one end of the plate 46 which is secured at the other end to the piston 50 of hydraulic cylinder 51 by means of a conventional yoke and pin element 52. The upper end of the hydraulic cylinder 51 is secured to a plate 53 which in turn is swingably attached to plate 46 through the ear 54 and lug 55 on plate 46 by means of a bearing pin 56. Mechanical stops 57 and 58, adjustably mounted on the plate 46, limit the rotational movement of the plate 53 about the pin 56. A second plate 59 is adjustably and slidably mounted on plate 53 by means of the hand screw 60 and bearings 61. The threaded portion of screw 60 engages an internally threaded lug 62 attached to plate 53. This permits the adjustment of the plate 59 with respect to plate 53 when the screw 60 is rotated which causes plate 59 to move horizontally guided by bearings 61. An alignment scale 63 mounted on plate 53 and an indicator 64 attached to plate 59 provides a convenient rough adjustment gauge for positioning plate 59 with respect to plate 53 and hence with respect to the vertical column 46. A grinder drive motor 65 is mounted on plate 59 by means of bolts 66 and drives the grinding wheel 67 through the shaft 68. The motor may be, for example, 1½ H.P. designed to rotate at 3600 r.p.m. The radial position of the grinder wheel 67 on the tire 1 can be easily varied through the screw arrangement previously mentioned to accommodate tires of different diameters.

A counterweight mechanism used to present the contact pressure between the grinder and the tire may be seen in FIG. 1 It is attached to the radially outer end of plate 59 and comprises threaded member 69 having an internally threaded weight 70 mounted thereon and a mechanical lock lug 71 at one end thereof.

A detail of the grinder wheel is shown in FIG. 5. The grinder wheel 67 is attached to shaft 68 by means of conventional key and bolt means. The wheel 67 is covered by the hood 72 attached to the plate 59 by bracket 73 shown in FIG. 4 and exhausted by a ventilating system (not shown) through the duct 74 in order to remove the powdered rubber which is ground from the tire as the grinder wheel 67 abrades the rib area 2 of the tire. A guide mechanism which controls the depth of grind is associated with the grinder wheel 67. This mechanism comprises the guide wheel 75 which rides along wall of the tire 1 and is adjustably attached to the hood 72 by means of the bar 76 and the thumb screw 77 which is attached to the hood 72 by means of bracket 78. The bar 76 is pivoted on the pin 79 attached to hood 72 and, consequently, the vertical position of the guide wheel 75 can be controlled through the screw 77. This permits setting the depth of cut by the grinder wheel 67 for most effective operation since the entire grinder assembly will be pivoted about pin 56 by the reacting force of the inflated tire 1 reacting against the wheel 75, through bracket 73 to the plate 59. Mechanical stop 58, of course, limits the total depth of cut by preventing further downward movement of the grinder assembly. An air jet 80 is provided adjacent the grinder wheel 67 to blow the powdered rubber off the tire surface in the area around the grinding wheel 67 so that it is more easily picked up and evacuated through the duct 74 by the independent exhaust system. The air jet also prevents the temperature of the tire 1 from rising to too high a point in the area of contact with the grinder which might result in scorching the tire. Vertical adjustment of the entire grinder wheel assembly, including the motor and hydraulic controls may be made by a conventional assembly comprising rack 81 and pinion 82 which acts to move column 47 relative to sleeve 48 and raises the complete unit to permit the accommodation of various sized tires.

Buffing assembly

FIGS. 6 and 7 illustrate the buffing assembly of the machine. The vertical column 83 is attached to the base 5 and carries brackets 84 near its upper end. The brackets 84 have threaded lugs 85 mounted therein which act as adjustable vertical stops for plate 86. The mounting plate 86 is attached to sleeve 87 which is fitted internally of the column 83. A hydraulic cylinder 88 rests on plate 89 secured to column 83, and has its piston rod 90 attached to plate 86. When cylinder 88 is actuated it moves the entire buffing assembly vertically into and out of contact with the sidewalls of the tire. Hydraulic lines 91 and 92 supply cylinder 88. A second plate 93 is tiltably mounted with respect to the plate 86 by means of rocker bearing assembly 94 and the screw assembly attached to the outer end of the plate 86 and also the plate 93. The screw assembly comprises threaded rod 95 attached to plate 93 by a rocker assembly 96 and to an extension 97 of plate 86 by a locking screw assembly 98. A motor mounting surface 99 is slidably attached to the plate 93 by means of bearings 100 and hand screw assembly 101 similar to the assembly described with regard to the grinders and in like manner permits the horizontal positioning of the brush so as to accommodate tires of various diameters. A buffer drive motor 102 is bolted to the surface 99 and drives a contoured buffing brush 103 through shaft 104. A bearing bracket 105 supports shaft 104 at one end and is attached at the other to plate 99. The drive motor may be, for example, 5 H.P. designed to rotate at 1800 r.p.m.

A detailed view of the brush assembly may be seen in FIG. 7. The contoured buffing brush 103 contacts the sidewall area 3 of the tire 1 intermediate the rib 2 and bead 4 thereof. A housing 106, attached to bracket 105, covers the brush and acts as a hood for the exhaust duct 107 through which is carried the debris created by the buffing action of the brush by means of an independent exhaust means (not shown). An air jet 108 provided adjacent the buffing brush prevents the accumulation of rubber particles on the brush and also assists in cleaning the tire and exhausting the particles out through the duct 107.

*Automatic control system*

FIGS. 8 and 9 are schematics of the electrical and pneumatic controls respectively. Referring to FIG. 8, the mains power, 440 volts, 3 phase, 60 cycle, supplies motors 109, 110, 111, and 112 through the conductors 113, 114, and 115. The motors correspond to the buffer, two grinders and chuck motors respectively mentioned in the description of the mechanical assemblies. Conventional circuit breakers are shown in each of the lines as an overload protection. Motor 109 causes the buffer to be driven in either a clockwise direction, depending on which of two sets of relay contacts in the lines to the motor 109 is closed. For the purposes of illustration, contacts 116, 117, and 118, when closed, may be assumed to provide the correct polarity to result in a clockwise rotation of the motor and consequently the buffer. Conversely, contacts 119, 120, and 121 will then cause a counter clockwise rotation if closed. As will later appear, the circuit is so arranged that one or the other but not both of the sets of contacts is closed throughout a complete cycle of the machine. Contacts 122, 123, and 124 are located in the power lines to motor 110 and control the starting and stopping thereof. Contacts 125, 126, and 127 are located in the power lines to motor 111 and control the starting and stopping thereof. Contacts 128, 129, and 130 in the power lines to motor 112 control the operation of the chuck motor. The primary of a transformer 131 is connected across power lines 113 and 115 and supplies mains power, 110 volts, 60 cycles, through its secondary to the sequential operational control circuit.

The mains power to the control circuit is carried by leads 132 and 133 from the secondary of transformer 131. A start switch 134, when actuated momentarily from its normally opened position, closes the circuit and sends power from conductor 132 through the normally closed stop switch 135, the start switch 134, the three relays 136, 137, and 138 and to conductor 133 through conventional overload devices designated collectively by the numeral 139. The completion of the aforementioned circuit actuates the relays 136, 137, and 138 to close the normally open contacts 140, 141, and 142 which lock the relays into the circuit so that switch 134 is shunted and the relays remain energized after switch 134. Actuation of the relays also closes the normally opened contacts 122–130 which causes motors 110, 111, and 112 to be energized.

The starting of buffer motor 109 and its direction of rotation is controlled by two additional circuits through start switch 134 which contain relays 143 and 144. The circuit to relay 143 contains two sets of normally closed contacts 145 and 146. The circuit to relay 144 contains the normally open contacts 147 and normally closed contacts 148. Contacts 145 and 147 are controlled by reversing relay 149 which makes its circuit through normally closed contacts 150, start switch 134, or alternately contacts 140, 141, and 142, and stop switch 135. Relay 143 controls contacts 148 in the line to relay 144 as well as one set of three contacts in the power lines to motor 109. Relay 144 controls contacts 146 as well as the other set of three contacts in the lines to motor 109. Upon closing of start switch 134, relay 143 is actuated, opening contacts 148 in the line to relay 144 and closing a set of three contacts in the lines to motor 109, for example—contacts 116, 117, and 118. This starts motor 109 rotating in what has been assumed to be clockwise direction. The motor 109 will continue to rotate in that direction until the circuit just described is broken. This is accomplished by the reversing relay 149 which in turn is controlled by contacts 150 actuated by counter relay 153. Relay 153 is set to actuate at any convenient number of complete cycles of the machine indicated by counting the actuations of switch 152. Approximately 6 cycles has been found to be an economical and preferred value at which relay 153 is made to energize to cause reversal of motor 109. When relay 153 actuates, contacts 150 are opened, deenergizing reversing relay 149, and also contacts 155 are closed, locking relay 153 into the circuit. When relay 149 changes state, contacts 145 open to deenergize relay 143 which closes contacts 148 as well as contacts 116, 117, and 118 in the lines to motor 109. Relay 149 also closes contacts 147 to complete the circuit to relay 144 which opens contacts 146 and closes contacts 119, 120, and 121 in the lines to motor 109. This reverses the direction of rotation of the motor 109 which then rotates in the counterclockwise direction until reversed again by the circuitry just described. Contacts 146 and 148, although they do not control the actuation of relays 143 and 144 directly, are placed in opposite lines to provide a safety feature so that motor 109 cannot be subjected to bucking voltages by the accidental occurrence of the simultaneous closing of both pairs of the reversing relay contacts. With the closing of the start switch 134, the circuitry just described causes the actuation of motors 109, 110, 111, and 112 which will continue to run until the stop switch 135 is actuated. This permits the buffing and grinding cycle to be repeated without the necessity of starting and stopping the motors each time and also facilitates the addition of an automatic loading feature to the machine of the present invention. The circuitry now to be described controls the vertical movement of the buffer and grinders with respect to the tire and the rotation of the tire independently of the state of operation of the drive motors.

To start the grinding and buffing cycle, the double contact switch 152 is closed, completing the circuit to the impulse counter solenoid 153 which counts one operation cycle, and at the same time completing the circuit to coil 154 which actuates the chuck raising mechanism through the pneumatic control. When the chuck reaches the raised position, normally open switch 156, which corresponds with microswitch 21 described in reference to the chuck assembly, closes, completing the circuit through normally closed contacts 157 and switch 156 to coil 158 which causes locking of the chuck through its co-operation with the pneumatic control. When the chuck is locked, switch 159 closes and completes the circuit to coil 160 which actuates the tire inflation system. Switch 159 corresponds to microswitch 42 previously described with reference to the chuck assembly. Inflation of the tire closes pressure switch 161 completing the circuit to time delays 162 and 163 through the normally closed contacts 164. Switches 165 and 166 are controlled by the time delay 162 and upon actuation of the switch 166 a circuit is completed through contact 165, across element 166 to energize the coil 167 which lowers the grinders into operating position through the pneumatic control system. After the preset grinding time is counted off by time delay 162, switch 165 opens the line to the coil 167 and closes the line to the coil 168 which signals the pneumatic system to retract the grinders from the tire. Actuation of the time delay 163 causes contact 169 to close after a pre-determined time to complete the circuit to the time delay 170. Time delay 170 controls the switch contacts 171 and 172. Upon actuation of delay 170, the contacts 171 close to energize the coil 173 through the line containing elements 171 and 172 which lowers the buffer through its co-operation with the pneumatic controls. After the time delay 170 has counted the preset buffing interval, contact 172 opens the line to coil 173 and closes the line to coil 174 which signals the pneumatic control to retract the buffer from its operating position. The closing of the line to coil 174 by the contact 172 also makes the circuit through relay 175 which closes normally open contacts 176 and opens normally closed contacts 157. The opening of contact 157 cuts out coils 158 and 160, and time delays 162 and 163. The breaking of the circuit to coil 160 causes the tire to deflate through co-operation with the pneumatic control circuit. Upon deflation of the tire, pressure switch 177, which had previously opened upon inflation of the tire, now closes to complete the circuit to coil 178 through the now closed contacts 176. Coil 178 energizes a control in the pneumatic circuit to unlock the chuck which results in the closing of switch 179 completing the circuit to coil 180. Switch 179 corresponds to microswitch 41 previously described with reference to the chuck assembly. Coil 180 actuates the chuck lowering mechanism through the pneumatic control system. Upon lowering of the chuck the double contacts 181 and 182 are momentarily actuated completing the circuit to the counter solenoid coil 183 and element 184 and opening the main line in the short cycle control circuit to be explained presently. The counter solenoid 183 records the completion of the processing of a tire on a conventional counter and the operating cycle is complete. Element 184 is in the circuit to permit electrical coupling of this circuit to a circuit controlling an automatic loader mechanism if one is to be used with the machine.

If a tire to be processed does not require the full cycle, the operator may utilize the short cycle control system. Instead of depressing switch 152 which would start the long cycle, the operator actuates switch 185 which puts the short cycle control in command. The closing of switch 185 completes the circuit to coil 154 in the same fashion as the closing of switch 152 previously described. Switch 185 also completes the circuit to the short cycle relay 186, closing the normally open contacts 187 which locks the short cycle into the line through switch 182 and also closing normally open contacts 188 and 189. When the short cycle solenoid 186 is energized, it also opens normally closed contacts 164 and closes normally open contacts 190, by-passing the two time delays 162 and 163 and completes the circuit to the short cycle time delay 191. When time delay 191 actuates, contacts 192 close completing the circuit to coil 167 and coil 173. The simultaneous energizing of coils 167 and 173 causes both the grinders and the buffer to lower into operating position. When the time delay 191 has counted off the preset short cycle time, switch 193 breaks the circuit to coils 167 and 173 and closes the circuit to coils 168 and 174 causing the grinders and the buffer to retract. The closing of the latter circuit also energizes solenoid 175. The remainder of the control cycle is the same as previously described with the exception that the momentary actuation of coil 180 opens contacts 182, thereby resetting the short cycle control to the off position.

FIGURE 9 illustrates the pneumatic control loop. One hundred pound air is is supplied through regulator 194 to the line 195. One branch of the line 195 connects through a lubricator 196 to solenoid actuated valves 197 and 198 which control the chuck locking and chuck raising cylinders 199 and 200 respectively. Control orifices 201 and 202 are located in the chuck raising cylinder line to provide a smoothing and controlling action on the pressure to the cylinder. A branch from the same line connects through a control valve 203 to three air jets for the grinders and the buffer, designated generally by the numeral 204. A second branch of line 195 connects through a pressure regulator 205 to an accumulator 206 which is set to operate at approximately 12–15 pounds pressure. From the accumulator 206, air is supplied to the solenoid actuated control valve 207 and then to the tire inflation manifold 208. Tire inflation and deflation pressure sensing devices, designated generally by the numeral 209, are tapped into the line after the control valve and preceding the inflation manifold 208. These pressure devices correspond electrically to elements 161 and 177 described in reference to the electrical control circuit. A third branch of line 195 supplies air to a pressure regulator 210 and then to accumulator 211 which is set to operate at approximately 75–90 pounds pressure. A line from accumulator 211 connects through a lubricating element 212 to the twin solenoid control valves 213 and 214. Air is supplied from control valve 213 to the buffer actuating cylinder 215. The lines to the buffer control cylinder 215 contain control orifices 216 and 217 which provide a smoothing action to the air pressure actuation. Control orifice 217 opens to the atmosphere to provide for the gravity drop of the buffer into contact with the white sidewall of the tire. A branch line connects ahead of control valve 213 and runs to the solenoid actuated control valve 214, thence through control orifice 218 and splits to supply air cylinders 219 and 220 which control the raising and lowering of the grinders. One end of each of these cylinders opens to the atmosphere to provide for the gravity drop of the grinders to contact with the tire rib area. A control orifice 221 is installed in reverse in the pressure line to cylinder 219. Hence, the orifice 221 acts in a variable manner on pressure, i.e., retraction of the grinder, and as full flow on exhaust, i.e., dropping of the grinder. The reason for this control will be explained subsequently.

OPERATION OF THE MACHINE

*Preliminary adjustments*

Prior to operation of the machine, certain adjustments must be made which consist primarily of the selection of the various cycle times, pressures for inflation and deflation of the tire, and the force to be applied by the grinders in contact with the rib area. It has been found that a complete operation may be performed on a tire in from 30–50 seconds depending on the condition of the tires. The following time delays and pressures have been found to provide most satisfactory results in the operation of the machine. Time delay 162 which controls the grinding time is set for 30 seconds. Time delay 163 which controls the buffing cycle is set to actuate 5 seconds after delay 162. Time delay 170 is set to provide a total buffing time of 30 seconds which results in the buffing of the tire for five seconds after the grinders have been retracted. Time delay 191 which controls the short cycle is set at approximately 15 seconds to provide a short simultaneous grind and buff on tires which are in somewhat better condition than the normal. Pressure switch 161 is set to actuate when the pressure in the tire reaches approximately eight pounds. Pressure switch 177 is set to actuate at a pressure of approximately four ounces when the tire deflates. The impulse counting system controlled by element 153 is set to reverse the rotation of the buffing brush at approximately 6 complete cycles which represents the processing of the same number of tires. It has been found that reversal of the brush every 6 cycles of the machine not only prevents permanent set of the bristles but also keeps the bristles sharp and at operationally effective peak due to the periodic reversal of wear.

As indicated in the description of the mechanical assembly, the position of the buffing wheel and the grinders may be adjusted by means previously described in order to accommodate tires of various diameters and cross sections. Prior to actual operation of the machine a typical tire is positioned on the chuck and the buffer and grinders adjusted to contact the tire at the suitable points. Routine maintenance and lubrication of the machine is, of course, performed periodically.

It is clear, of course, that a distinct improvement in the grinding of the rib area of the tire by causing the grinders to contact the tires and grind them under a vertical pressure determined by gravity alone. While systems may be devised to constantly correct for fluctuation in the force on the grinder these are expensive and in many instances delicate and difficult to adjust. In the present invention, the grinder motors may be positioned on their mounting plates so as to produce essentially zero rotational moment about mounting axis of the grinder assembly. Thus, adjustment of the counterweight assembly described previously may be made to effectively set the rotational moment of the assembly about its mounting axis and, hence, accurately control the vertical force component between the tire and the grinders. Obviously, this will be the sole force to control the grinding rate and no complicated adjustments are necessary to assure a constant force for the entire depth of cut. A further advantage is apparent in that the grinders, being pivotable as assemblies, and being held in contact with the tire only by gravity and, hence, may float with the tire to compensate for any minor irregularities or out of round characteristics which may be present in the area being ground. It has been found that adjustment of the counterweights to secure a force between the tire and grinders of approximately a pound results in an efficient and effective finish. Once the operator sets this unbalance, it need not be changed for different sized tires since the effective moment arm of the force will deviate only slightly with the angle of inclination of the grinder assembly. This latter feature represents an additional advantage of the present machine.

A further advantage of the dual grinding wheels is that grinding stones of various grits may be pre-selected and mounted on the machine prior to operation in order to provide the desired finish of the rib. Typical combinations of grits are grit number 60 on one wheel, grit number 120 on the other, or a combination of grit 46 and grit 120. If desired, the wheels may be matched, for example, with a 120 grit on each. The depth of grind of each wheel may be set by the guide mechanism previously described to secure the best finish in the least time with the particular grits utilized.

It should further be appreciated that the oppositely rotating grinder wheels tend to counteract each other in so far as the tendency to rough or produce a grain in the stock surface, and hence a finer finish is obtained in the rib area. It has been found that an abrader tends to rough up the surface it is abrading and that this roughness tends to lie in a direction counter to the motion of the abrader. The provision of counteracting grinders in the present invention avoids the problem of residual roughness since they tend to cancel each other. The desired final finish may be selected, however, by utilizing grinders having the suitable combination of grits as mentioned above and setting the depth of grind for maximum speed and finishing action.

*Complete machine cycle*

The operator, having set the machine as described above, places a tire on the lower chuck half 9. It should be noted that the chucks may be removable, hence, and may be changed to accommodate tires of different bead diameters. It has been found that a tire can be placed on and removed from the machine in approximately six seconds due to the ease of mounting a tire on the lower half of the chuck and the lack of necessity of buttoning the tire beads over a solid, one-piece rim. Thus, a substantial saving of time is effected in the operation of the machine on a commercial scale. Having placed the tire on the machine, the operator depresses start switch 134 which, as previously described, starts the buffer, grinder, and chuck motors. These motors reach operating speed in approximately two seconds. In the continuous operation of the machine, the motors are left running so that there is no delay necessary between operating cycles to allow the motors to reach normal speed. Momentarily closing switch 152 then starts the grinding and buffing cycle. Where the loading of the machine is manual, switch 152 may be a foot switch so that the operator has both hands free to load the machine for operation. With an automatic loader, a microswitch on the chuck or some other convenient place may replace the foot switch. Upon actuation of switch 152, coil 154 controlling valve 198 energizes to open the valve and pneumatically actuate cylinder 200 which raises the lower half chuck 9 into contact with the upper half chuck 31, mounting the tire for operation as previously described. When the chuck raises into position, the microswitch 21 located at the end of lever arm 11 and corresponding to electrical element 156 is actuated, signalling to the control circuit that the chuck is up. The control circuit then energizes coil 158 associated with control valve 197 to actuate cylinder 199 which locks the chuck through the mechanical lock mechanism described above. The locking of the chuck causes actuation of the microswitch 42, corresponding to electrical element 159, which signals to the control circuit that the chuck is locked. The control circuit, by means previously described, then energizes coil 160 on control valve 207 which results in inflation of the tire. Upon inflation of the tire, pressure switch 161 closes and the time delay switches controlling the grinding and buffing cycles are thrown into the circuit in the manner described with reference to the electrical control system. By means of circuitry previously described and at the time intervals at which the delays have been set, the grinders drop into operating position on the rib area of the tire and five seconds later, the buffer drops into contact with the tire sidewall. The movement of the grinders and the buffer is accomplished through coils 167 and 173 on control valves 213 and 214 which open in turn cylinders 215, 219, and 220 to atmosphere to drop the grinders and buffer into contact with the tire under the force of gravity. After completion of the grinding time, the grinders are raised out of contact with the tire through the operation of the time delays which energize coil 168 on control valve 214 to send air to cylinders 219 and 220. Approximately five seconds later the buffer time delay energizes coil 174 on control valve 213 which sends air to cylinder 215 and retracts the buffer. It will be apparent that since the grinding wheels are disposed circumferentially in spaced relation along the tire rib area, it is necessary to delay the retraction of one grinder slightly in order to assure that the rib is equally abraded by both wheels. This delay is built into the pneumatic control by the variable orifice 221 in the pressure leg of cylinder 219. As previously mentioned, this orifice is installed in reverse to act in a variable manner which delays actuation of cylinder 219 for a slight interval and, hence, delays the retraction of the second grinder controlled by cylinder 219 for a short period after the first has been retracted from the tire. Thus, the second grinder can be made to complete the processing of the entire circumference of the rib area, ending at the same point from which the first grinder was retracted from the tire.

Upon completion of the cycle period, the control circuit signals that the tire is completed and through means previously described deenergizes coil 154 on control valve 207 to exhaust the tire to the atmosphere. Upon deflation of the tire, the pressure sensing element 209 signals the control circuit through pressure switch 177 that the tire is deflated. As previously described, this completes the necessary circuits to energize coils 178 and 180 on control valves 197 and 198 which unlock the chuck and drop lower chuck half 9 by means of cylinders 199 and 200 respectively. Through the microswitches on the mechanical assemblies, the unlocking of the chuck and the lowering thereof is signalled to the control circuit which is then reset in readiness for another operation. In this way, the machine goes through a complete cycle and by the simple actuation of switch 152 may be used to continuously process tires on a production basis. The short cycle control system previously described offers, of course, a similar but shorter operating cycle of the machine in a manner which is apparent from the description.

While certain representative embodiments and details have been shown for the purpose of illustrating the invention, it will be apparent to those skilled in this art that various changes and modifications may be made therein without departing from the spirit or scope of the invention.

I claim:

1. A machine for finishing tire sidewalls comprising in combination a base, chuck means mounted on said base and adapted to receive and inflatably hold a tire disposed horizontally with respect to said base, means to inflate a tire on said chuck means, means to rotate said chuck and tire thereon, grinder means, support means for said grinder means adjacent said chuck means, said grinder means disposed on said support means for rotation about an axis generally radial of a tire on said chuck means, buffer means, support means for said buffer means adjacent said chuck means, said buffer means disposed on said support means for rotation about an axis generally radial of a tire on said chuck means and buff substantially all of said tire in the portion intermediate the rib area and bead thereof without contacting said rib area, and means to rotate said grinder means and buffer means.

2. A machine as claimed in claim 1 in which said grinder means includes at least two grinding wheels disposed circumferentially of said tire and adapted to rotate in opposite directions and to contact said tire in the rib area thereof, and in which said means to rotate said grinder means is adapted to rotate the said grinder wheels in said opposite directions whereby the rib area is subjected to opposed abrading forces.

3. A machine as claimed in claim 1 including means to move said grinder means in a direction substantially perpendicular to the axis of rotation thereof whereby said grinder means shifts in and out of contact with said tire, said means to move said grinder means being so constructed and arranged to retract said grinder means out of contact with said tire by positive force and release said grinder means from the retracted position whereby the said grinder means moves into contact with said tire and abrades said rib area under the force of gravity.

4. A machine as claimed in claim 1 including guide means associated with said grinder means to control the maximum depth of cut of said grinder means on said tire.

5. A machine as claimed in claim 1 in which said chuck means comprises two half-chuck means disposed substantially coaxially of each other and movable relative to each other along the axis mutual thereto.

6. A machine as claimed in claim 1 including control means for periodically reversing the direction of rotation of said buffer means, whereby the bristles thereof are resharpened and permanent set in said bristle is avoided.

7. A machine for finishing tire sidewalls comprising in combination a base, chuck means mounted on said base and adapted to receive and inflatably hold a tire disposed horizontally with respect to said base, means to inflate a tire on said chuck means, means to rotate said chuck and tire thereon, grinder means comprising at least two grinding wheels disposed circumferentially of a tire on said chuck means and adapted to rotate in opposite directions, support means for said grinder means adjacent said chuck means, said grinder means disposed on said support means for rotation about an axis generally radial of a tire on said chuck means and adapted to contact a tire on said chuck means in the rib area thereof, buffer means, support means for said buffer means adjacent said chuck means, said buffer means disposed on said support means for rotation about an axis generally radial of a tire on said chuck means and adapted to buff substantially of of said tire in the portion intermediate the rib area and bead thereof without contacting said rib area, means to rotate said buffer means, means to rotate said grinder means in said opposite directions whereby the rib area of a tire on said chuck means is subjected to opposed abrading forces, and means to move said grinder means in a direction substantially perpendicular to the axis of rotation thereof whereby said grinder means shifts in and out of contact with a tire on said chuck means.

8. A machine as claimed in claim 7 including guide means associated with said grinder means to control the maximum depth of cut of said grinder means on said tire.

9. A machine as claimed in claim 7 in which said chuck means comprises two half-chuck means disposed substantially coaxially of each other and movable relative to each other along the axis mutual thereto.

10. A machine as claimed in claim 7 including control means for periodically reversing the direction of rotation of said buffer means whereby the bristles are resharpened and permanent set to said bristles is avoided.

11. A machine as claimed in claim 7 in which said means to move said grinder means is so constructed and arranged to retract said grinder means out of contact with said tire and abrades said rib area by positive force and release said grinder means from the retracted position whereby the said grinder means moves into contact with said tire under the force of gravity.

12. A machine for finishing tire sidewalls comprising in combination a base, chuck means mounted on said base and adapted to receive and inflatably hold a tire disposed horizontally with respect to said base, grinder means comprising at least two grinding wheels disposed circumferentially of a tire on said chuck means and adapted to rotate in opposite directions, support means for said grinder means adjacent said chuck means, said grinder means disposed on said support means for rotation about an axis generally radially of a tire on said chuck means and adapted to contact a tire on said chuck means in the rib area thereof, buffer means, support means for said buffer means adjacent said chuck means, said buffer means disposed on said support means for rotation about an axis generally radial of a tire on said chuck means and adapted to buff substantially all of said tire in the portion on said chuck means intermediate the rib area and bead thereof without contacting said rib area, means to rotate said buffer means, means to rotate said grinder means in opposite directions whereby the rib area of a tire on said chuck means is subjected to opposed abrading forces, means to move said grinder means in a direction substantially perpendicular to the axis of rotation thereof whereby said grinder means shifts in and out of contact with a tire on said chuck means, said means being so constructed and arranged to retract said grinder means out of contact with a tire on said chuck means by positive force and release said grinder means from the retracted position whereby said grinder means moves into contact with said tire and abrades said rib area on said chuck means under the force of gravity, and guide means associated with said grinder means to control the maximum depth of cut of said grinder means.

13. A machine as claimed in claim 12 in which chuck means comprises two half-chuck means disposed substantially coaxially of each other and movable relative to each other along the axis mutual thereto.

14. A machine as claimed in claim 12 including control means for periodically reversing the direction of rotation of said buffer means.

15. A method of finishing tire sidewalls comprising the step of abrading the rib area thereof simultaneously in opposite directions.

16. A method of finishing tire sidewalls comprising the step of subjecting the rib area thereof to abrading forces opposed in the direction substantially parallel to a plane normal to the axis of said tire.

17. A method of finishing the sidewall of a tire comprising the step of applying thereto a buffing force by means of a buffing brush and periodically reversing the direction of action of said buffing brush whereby the bristles thereof are resharpened and permanent set in said bristles is avoided.

18. A method as claimed in claim 16 including the step of applying a buffing force to the sidewall of the tire by means of a buffing brush and periodically reversing the direction of action of said brush whereby the bristles thereof are resharpened and permanent set of said bristles is avoided.

19. A machine for finishing tire sidewalls comprising, in combination, a base, chuck means mounted on said base and adapted to receive and inflatably hold a tire, means to inflate a tire on said chuck means, means to rotate said chuck and a tire thereon, grinder means, support means for said grinder means adjacent said chuck means, said grinder means disposed on said support means and comprising at least two abraders disposed circumferentially of a tire on said chuck means in the rib area thereof and adapted to act thereon in opposed directions to each other, buffer means, and support means for said buffer means adjacent said chuck means, said buffer means disposed on said support means to extend towards a tire on said chuck means along an axis generally radially thereof and to buff substantially all of a tire in the portion intermediate the rib area and bead thereof without contacting the rib area.

References Cited in the file of this patent

UNITED STATES PATENTS

| | | |
|---|---|---|
| 2,680,938 | Peterson | June 14, 1954 |
| 2,707,851 | Strong | May 10, 1955 |

UNITED STATES PATENT OFFICE
CERTIFICATE OF CORRECTION

June 6, 1961

Patent No. 2,986,849

Harold H. Clark

It is hereby certified that error appears in the above numbered patent requiring correction and that the said Letters Patent should read as corrected below.

Column 4, line 22, for "present" read -- preset --; column 12, line 37, strike out "and abrades said rib area", and insert the same after "tire" in line 40, same column; same column 12, line 57, for "tire in the portion on said chuck means" read -- tire on said chuck means in the portion --; same column 12, lines 70 and 71, for "and abrades said rib area on said chuck means" read -- on said chuck means and abrades said rib area --.

Signed and sealed this 14th day of November 1961.

(SEAL)
Attest:

ERNEST W. SWIDER
Attesting Officer

DAVID L. LADD
Commissioner of Patents
USCOMM-DC